(12) United States Patent
Balzer et al.

(10) Patent No.: US 8,188,631 B2
(45) Date of Patent: May 29, 2012

(54) ROTOR OF REDUCED WEIGHT FOR AN ELECTRIC MACHINE

(75) Inventors: Christoph Balzer, Berlin (DE); Karsten Brach, Berlin (DE); Christian Meyer, Berlin (DE); Andre Schlawitz, Berlin (DE); Ingo Schüring, Schönwalde (DE)

(73) Assignee: Siemens Aktiengesellschaft, München (DE)

( * ) Notice: Subject to any disclaimer, the term of this patent is extended or adjusted under 35 U.S.C. 154(b) by 101 days.

(21) Appl. No.: 12/762,748

(22) Filed: Apr. 19, 2010

(65) Prior Publication Data

US 2010/0264775 A1 Oct. 21, 2010

(30) Foreign Application Priority Data

Apr. 17, 2009 (DE) .......................... 10 2009 017 850

(51) Int. Cl.
*H02K 23/50* (2006.01)
*H02K 23/60* (2006.01)
*H02K 13/00* (2006.01)

(52) U.S. Cl. ... 310/216.133; 310/216.116; 310/216.122; 310/216.129

(58) Field of Classification Search ........... 310/216.001, 310/216.007, 216.053, 216.057, 216.061, 310/216.121, 216.122, 216.127–129, 216.133

See application file for complete search history.

(56) References Cited

U.S. PATENT DOCUMENTS

| | | | |
|---|---|---|---|
| 2,157,046 A | | 5/1939 | Wood |
| 2,927,229 A | * | 3/1960 | Merrill .......................... 310/162 |
| 4,471,248 A | * | 9/1984 | Smetana ........................ 310/51 |
| 6,891,300 B2 | | 5/2005 | Kiriya |
| 2004/0046472 A1 | | 3/2004 | Erfanfar |
| 2007/0096584 A1 | | 5/2007 | Kiriya |
| 2007/0228858 A1 | * | 10/2007 | Malmberg ............... 310/156.01 |
| 2008/0088194 A1 | * | 4/2008 | Jarvinen et al. .......... 310/156.23 |
| 2009/0015020 A1 | * | 1/2009 | Stiesdal ......................... 290/55 |

FOREIGN PATENT DOCUMENTS

| | | |
|---|---|---|
| CH | 280637 A | 1/1952 |
| DE | 578782 C | 6/1933 |
| DE | 19960182 A1 | 6/2001 |
| DE | 69816134 T2 | 4/2004 |

(Continued)

OTHER PUBLICATIONS

Machine Translation JP10032946 (1998) and DE102006011729 (2007).*

*Primary Examiner* — Quyen Leung
*Assistant Examiner* — Jose Gonzalez Quinones
(74) *Attorney, Agent, or Firm* — Henry M. Feiereisen; Ursula B. Day

(57) ABSTRACT

A rotor for an electrical machine includes a first shaft part and a second shaft part, which is arranged separately from the first shaft part. A first supporting element is connected in a manner fixed against rotation to the first shaft part, and a second supporting element is connected in a manner fixed against rotation to the second shaft part. The rotor has a yoke which connects the first supporting element to the second supporting element and includes a plurality of laminates arranged one behind the other, and which has cutouts extending in the direction of the axis of rotation in the interior of the yoke, and permanent magnets arranged in the cutouts. The yoke has holes extending in the direction of the axis of rotation, with tensioning pins extending through the holes in the yoke to brace the laminates.

14 Claims, 2 Drawing Sheets

FOREIGN PATENT DOCUMENTS

| | | | |
|---|---|---|---|
| DE | 69825386 T2 | 8/2005 | |
| DE | 102006011729 | * | 9/2007 |
| DE | 102006011729 A1 | 9/2007 | |
| DE | 102006047186 A1 | 4/2008 | |
| EP | 0509119 A1 | 10/1992 | |
| FR | 517790 A | 5/1921 | |
| JP | 61189147 A | 8/1986 | |
| JP | 61262040 A | * | 11/1986 |
| JP | 10032946 A | * | 2/1998 |
| WO | WO 2005117235 A1 | 12/2005 | |
| WO | WO 2006003244 A2 | 1/2006 | |
| WO | WO 2007104617 A1 | 9/2007 | |

* cited by examiner

ROTOR OF REDUCED WEIGHT FOR AN ELECTRIC MACHINE

CROSS-REFERENCES TO RELATED APPLICATIONS

This application claims the priority of German Patent Application, Serial No. 10 2009 017 850.3, filed Apr. 17, 2009, pursuant to 35 U.S.C. 119(a)-(d), the content of which is incorporated herein by reference in its entirety as if fully set forth herein.

BACKGROUND OF THE INVENTION

The present invention relates, in general, to a rotor for an electrical machine.

The following discussion of related art is provided to assist the reader in understanding the advantages of the invention, and is not to be construed as an admission that this related art is prior art to this invention.

Until now, rotor pole magnet systems have been fitted in a plurality of magnet part systems on one pole wheel per pole. A magnet part system in this case comprises a basic body, on which a plurality of permanent magnets are fixed by means of adhesive bonding. The basic body is screwed to the pole wheel. The basic body can be solid or laminated, in order to avoid electrical losses, depending on the electrical conditions. Since permanent magnets are made from a relatively brittle material, a protective function to prevent air being slung away in the radial and tangential direction in the form of a pole cap or shroud is required. In the case of the rotors known from the prior art, as has already been described, a pole wheel is required for implementing the rotor, on which pole wheel the permanent magnets of the rotor are fixed via the basic body. However, such a pole wheel has the first disadvantage that it is very heavy and the second disadvantage that its manufacture is complex.

It would therefore be desirable and advantageous to provide an improved rotor for an electric machine to obviate prior art shortcomings.

SUMMARY OF THE INVENTION

According to one aspect of the present invention, a rotor for an electrical machine includes a first shaft part, a second shaft part arranged separately from the first shaft part, said first and second shaft parts being arranged one behind the other with respect to a common axis of rotation, a first supporting element connected in a manner fixed against rotation to the first shaft part, a second supporting element connected in a manner fixed against rotation to the second shaft part, a yoke connecting the first supporting element to the second supporting element and having a plurality of laminates arranged one behind the other, said yoke having an interior provided with cutouts which extend in a direction of the axis of rotation, and permanent magnets arranged in the cutouts, said yoke having holes extending in the direction of the axis of rotation, and tensioning pins extending through the holes in the yoke to brace the laminates.

By virtue of the fact that the yoke of the rotor according to the invention is designed as a self-supporting element, it is possible to completely eliminate the need for a conventional pole wheel. As a result, the rotor can be constructed at considerable weight saving and manufactured in a considerably simpler fashion.

According to another advantageous feature of the present invention, the first shaft part and the second shaft part and the first supporting element and the second supporting element and the yoke can be connected to one another via ribs. The ribs provide hereby additional reinforcement for the structure.

According to another advantageous feature of the present invention, the cutouts on tangential outer sides may have a size which is greater than a width of the permanent magnets. In this way, the resultant remaining space can be used as a cooling channel for heat dissipation.

According to another advantageous feature of the present invention, the permanent magnets can be fixed in the cutouts by an adhesive or by cast resin. The permanent magnets can thus be fixed in an inexpensive and simple manner.

According to another advantageous feature of the present invention, at least some of the holes can be arranged between the cutouts. The tensioning pins, which are arranged in the holes, can then form a so-called squirrel cage. In the event of a short circuit, the risk of demagnetization of the permanent magnets is thus reduced. Owing to the resultant small width of the webs which are produced in the region of these holes, in addition a magnetic flux barrier is produced in order to minimize leakage flux.

According to another advantageous feature of the present invention, in the event, not all of the holes are arranged between the cutouts, the remaining holes can be arranged offset in the radial direction with respect to the holes which are arranged between the cutouts. This ensures uniform pressing and bracing of the laminates, in particular also in the peripheral regions of the yoke. While the number of tensioning pins is increased thereby, it becomes possible to dimension the tensioning pins correspondingly smaller.

According to another advantageous feature of the present invention, at least two permanent magnets may be arranged in each of the cutouts, with an amagnetic separating wall separating the at least two permanent magnets from one another and configured to absorb a centrifugal force of the permanent magnets as the rotor rotates and to divert the centrifugal force into a part of the yoke in confronting relationship to the axis of rotation. As a result, that part of the rotor which is remote from the axis of rotation is relieved of load since this part does not need to completely absorb the centrifugal forces produced by the permanent magnets on rotation. Furthermore, a magnetic flux which occurs between the two magnets is reduced.

According to another advantageous feature of the present invention, at least two permanent magnets may be arranged in each of the cutouts and separated from one another by an air gap. As a result, firstly the magnetic flux between the two permanent magnets is reduced and secondly an air gap is provided for heat dissipation.

According to another advantageous feature of the present invention, the yoke can have an end side in confronting relationship to the second supporting element, with the end side abutting the second supporting element. By virtue of this design measure, the second supporting element can act as a stacking apparatus for stacking and bracing the laminates. The need for a stacking apparatus which is normally required for stacking the laminates can therefore be eliminated when manufacturing the rotor, so that the rotor can be produced in an inexpensive and simple manner.

Application of a rotor according to the present invention has proven to be particularly advantageous when constructing the machine in the form of a wind power generator. Wind power generators often have rotors with large diameters, with the result that a rotor with a lower weight is of considerably advantage in particular in wind power generators since, by virtue of this measure, it is possible to reduce the weight of the wind power generator which is mounted at a considerably height and it is possible to design the supporting structure for the wind power generator to be simpler.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
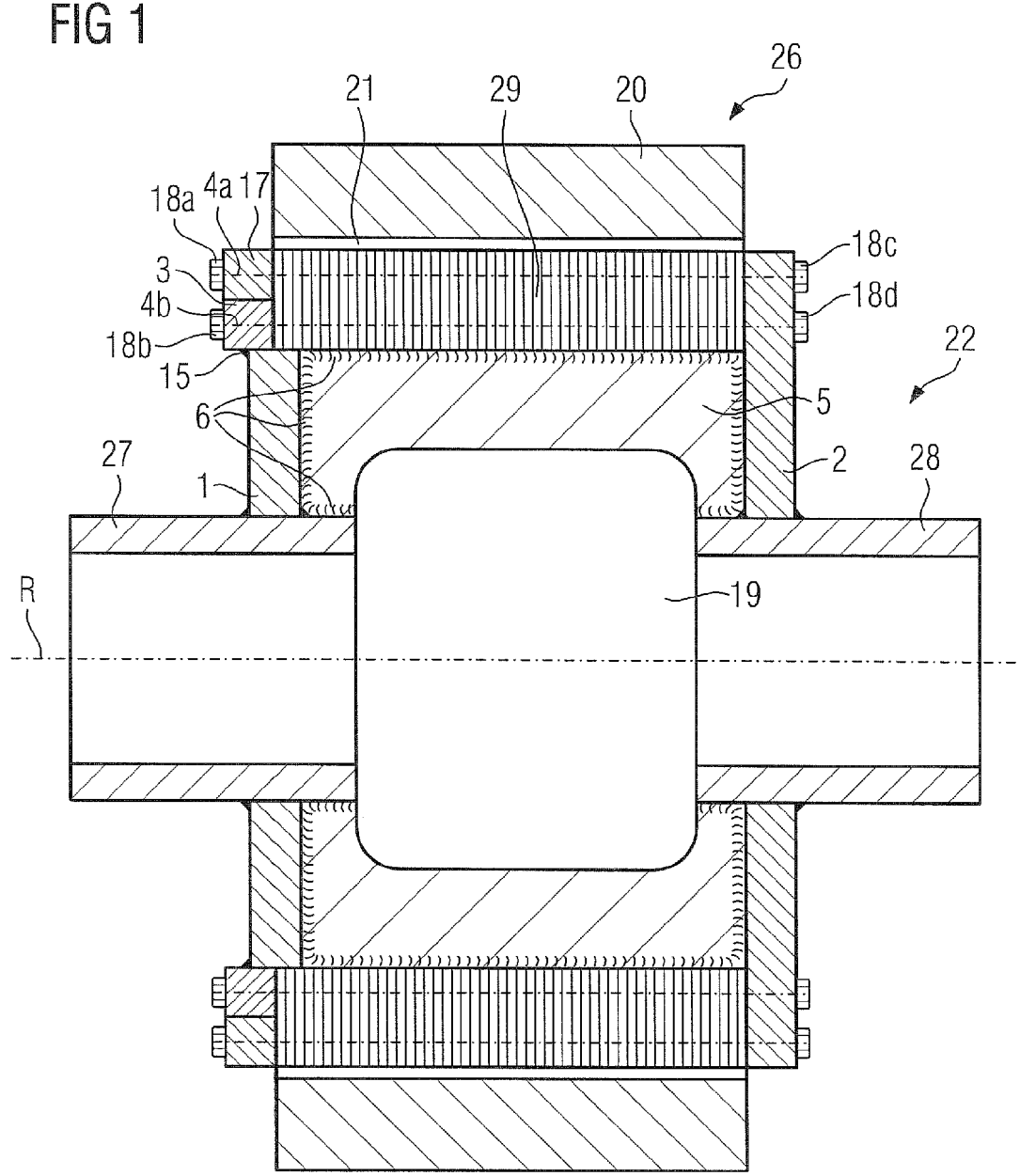
FIG. 1 is a sectional view of a machine with a rotor according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a sectional view of a machine, generally designated by reference numeral 26, illustrating only those parts of the machine 26 which are necessary for the understanding of the invention. The machine 26 can represent a generator, for example, in particular a wind power generator, or an electric motor.

The machine 26 has a stationary stator 20, which, in the case of a design of the machine 26 in the form of a motor, drives a rotor 22 according to the invention to rotate via the magnetic field generated by said motor, the rotor 22 rotating about an axis of rotation R. An air gap 21 is arranged between the stator 20 and the rotor 22.

The rotor 22 according to the invention, in contrast with conventional rotors, does not include a single-piece shaft, but rather a shaft made of two parts. The rotor 22 therefore has a first shaft part 27 and a second shaft part 28, which is arranged separately from the first shaft part 27 via an air gap 19. The first shaft part 27 and the second shaft part 28 are arranged one behind the other with respect to the axis of rotation R.

Furthermore, the rotor 22 has a first supporting element 1 and a second supporting element 2 for fastening a yoke 29. The first supporting element 1 is connected in a manner fixed against rotation (for example via a welded joint) to the first shaft part 27, and the second supporting element 2 is connected in a manner fixed against rotation (for example via a welded joint) to the second shaft part 28. The first and the second supporting element are in this case in the form of rings, within the context of the exemplary embodiment.

Figure 2:
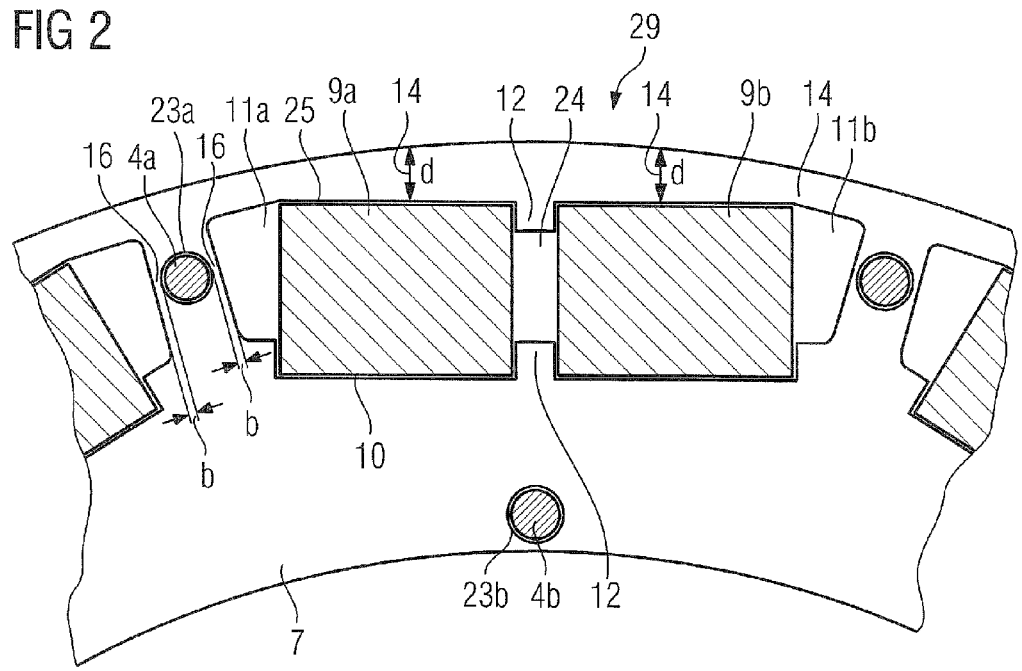
FIG. 2 is an enlarged detailed view of a laminate of an exemplary embodiment of a yoke of the rotor according to the present invention.

FIG. 2 illustrates a detail of the yoke 29 in the context of a first embodiment of the invention. The yoke 29 comprises a number of laminates arranged one behind the other with respect to the axis of rotation R, with only one laminate 7 being illustrated in FIG. 2. In this case, the laminates are preferably in segmented form over the circumference and to this extent preferably each comprise a plurality of segments, which are arranged to form a ring. In the case of small diameters of the rotor, the segmented laminates can be dispensed with and be replaced by a round blank, i.e. a single laminate per layer of the yoke. The individual laminates are in this case arranged uniformly and are stacked and braced in the direction of the axis of rotation R. The laminates of the individual layers are arranged in a manner in which they are electrically insulated from one another via an electrically insulating layer.

The laminates have cutouts, wherein only one cutout 25 has been provided with a reference symbol for reasons of clarity. Furthermore, the laminates have holes, wherein only one hole 23a and one hole 23b have been provided with a reference symbol for reasons of clarity. To such an extent, the yoke 29 has cutouts running in the direction of the axis of rotation R in the interior of the yoke 29 and holes running in the direction of the axis of rotation R in the interior of the yoke 29 within the context of the exemplary embodiment. In this case, permanent magnets are arranged in the cutouts, wherein in the context of the exemplary embodiment, two permanent magnets 9a and 9b are arranged in each cutout. However, it is of course also possible for only one individual permanent magnet to be provided per cutout or else more than two permanent magnets to be provided per cutout. The cutouts are given dimensional tolerances such that a minimum joining play 10 results between the permanent magnets and the cutout. In order to prevent movements of the permanent magnets within the cutouts in the operating state, said permanent magnets are preferably fixed permanently in the cutouts with an adhesive or cast resin. The cutouts are in this case designed to be larger in their tangential outer sides than the width of the permanent magnets. The resultant remaining free spaces 11a and 11b act as a cooling channel for heat dissipation. The width b of the webs 16 between two adjacent cutouts and the hole arranged between the two adjacent cutouts is designed to be as small as technically possible.

The permanent magnets are inserted into the cutouts when the yoke 29 is fitted. In order to reduce the magnetic flux, an air gap 24 and two lugs 12, which separate the two permanent magnets from one another, are arranged between the permanent magnets. The air gap 24 can preferably be used as a further cooling channel for improved heat dissipation.

In order to brace the laminates, tensioning pins are arranged in the holes, wherein only the tensioning pins 4a and 4b have been provided with reference symbols in FIG. 2 for reasons of clarity. In this case, the tensioning pins pass through the yoke 29. The laminates are braced with one another via screw-type connections arranged at both ends of the yoke 29 by means of the tensioning pins and in this way a laminate stack is formed. In order to brace the laminates, in this case the rotor 22 has, inter alia, the nuts 18a, 18b, 18c and 18d (see FIG. 1). The tensioning pins are in this case preferably distributed uniformly over the circumference of the yoke 29.

In the context of an advantageous development of the invention, as has already been described and illustrated in FIG. 2, not all of the holes are arranged between the cutouts, but some holes are arranged offset in the radial direction with respect to the holes which are arranged between the cutouts. Such a hole has been provided with the reference symbol 23b in FIG. 2. The fact that the holes are arranged offset in the radial direction makes it possible to uniformly brace the laminates.

Figure 3:
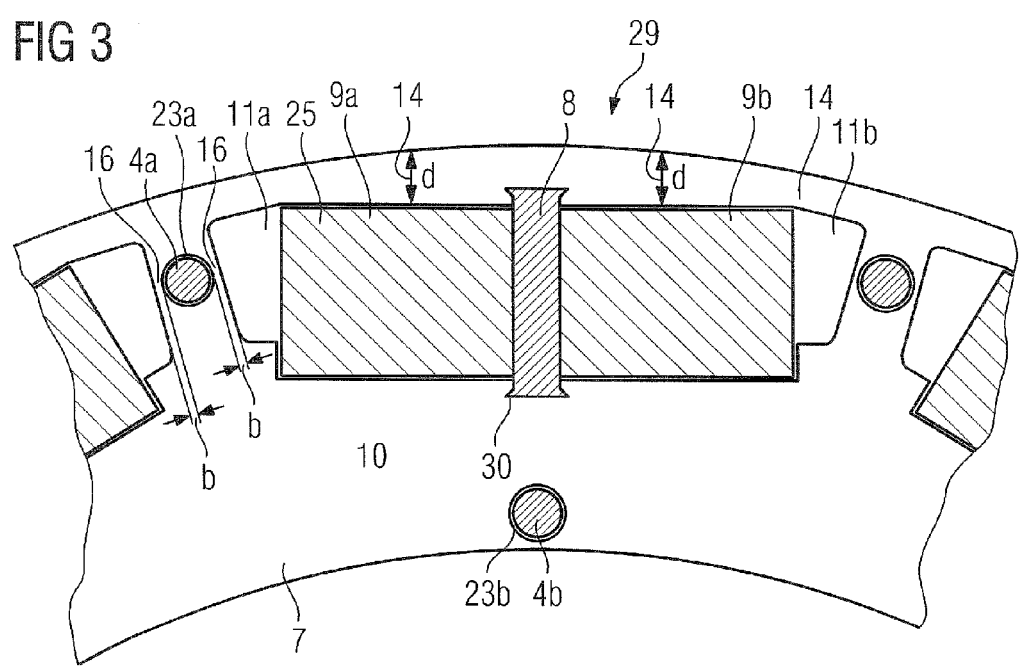
FIG. 3 is an enlarged detailed view of a laminate of another exemplary embodiment of a yoke of the rotor according to the invention.

FIG. 3 shows a second embodiment of the invention. The embodiment illustrated in FIG. 3 corresponds in terms of its basic design substantially to the embodiment described above in FIG. 2. Identical elements have therefore been provided with the same reference symbols in FIG. 3 as in FIG. 2. The single essential difference consists in that, in the embodiment shown in FIG. 3, the two permanent magnets 9a and 9b are arranged in a manner separated from one another via an amagnetic separating wall 8 instead of an air gap 24, the separating wall 8 having such a shape that the separating wall 8 absorbs some of the centrifugal forces of the permanent magnets which are produced on rotation of the rotor and diverts them into that part of the yoke 29 which faces the axis of rotation R. In the context of this exemplary embodiment, the separating wall 8 has lugs for absorbing the centrifugal forces, wherein only one lug 30 has been provided with a reference symbol for reasons of clarity. As a result, that part of the yoke which is remote from the axis of rotation R is relieved of mechanical load since said part does not need to completely absorb the centrifugal forces generated by the permanent magnets on rotation. Furthermore, a magnetic flux which occurs between the two permanent magnets 9a and 9b is reduced by the separating wall 8.

As illustrated in FIG. 1, the rotor 22 has annular covers 3 and 17 for covering and bracing the laminates and therefore the yoke 29, said covers 3 and 17 also being used to cover the permanent magnets. In order to join the yoke 29 to the first supporting element 1, the cover 3 is welded to the first supporting element 1 via a welded joint 15, in the context of the exemplary embodiment. The yoke 29 is screwed and therefore joined to the second supporting element 2 via the tensioning pins 4a and 4b, which are illustrated by way of example and are indicated by dashed lines in FIG. 1 and run through the yoke 29, via the nuts 18c and 18d. The covers 17 and 3 are screwed and therefore joined to the yoke 29 via nuts 18a and 18b and via the tensioning pins 4a and 4b.

To such an extent, in the context of the exemplary embodiment, the first supporting element 1 is joined to the second supporting element 2 via the yoke 29.

In the context of the exemplary embodiment, in this case the yoke 29 and the second supporting element 2 are advantageously arranged in such a way that that end side of the yoke 29 which faces the second supporting element 2 abuts the second supporting element 2. The second supporting element 2 therefore forms, together with the covers 17 and 3 and the tensioning pins, a stacking apparatus for stacking and tensioning the laminates of the yoke, with the result that when the yoke 29 and therefore the rotor 22 are produced, it is possible to dispense with the separate external stacking apparatus which is otherwise required in the manufacture of conventional rotors.

According to the invention, the yoke 29 is therefore in the form of a self-supporting element and it is possible to completely dispense with a pole wheel. The solution according to the invention, as has already been mentioned, has the advantage that a pole cap can be completely dispensed with, wherein, according to the invention, the yoke 29 together with the tensioning pins passing through the yoke 29 is a structurally supporting element of the rotor 22.

The cutouts are in this case designed in such a way that the thickness d of the webs 14 resulting with respect to the air gap 21 (see FIG. 2 and FIG. 3) completely absorb the centrifugal forces of the permanent magnets in the context of the embodiment shown in FIG. 2 and largely absorb the centrifugal forces of the permanent magnets in the context of the embodiment shown in FIG. 3. This makes a simplified adhesive-bonding process possible since the permanent magnets only need to be prevented from "flapping" within the cutouts. In addition, the complex fitting process of the magnet part systems which are otherwise conventional in conventional rotors is dispensed with since, with the design according to the invention of the rotor, the permanent magnets only need to be inserted into the yoke, and therefore the centrifugal forces are absorbed by the laminates of the yoke and do not need to be held by an adhesive.

Furthermore, according to the invention, the shaft is no longer formed in one piece, but in two pieces, wherein the first and the second shaft part are separated from one another via a wide air gap 19, with the result that the weight of the shaft and therefore of the rotor is also further reduced by the construction, in addition to the pole cap which is no longer required. In the context of an advantageous embodiment, the first shaft part and the second shaft part and the first supporting element and the second supporting element and the yoke can be joined to one another, if required, via welded joints 6, via ribs 5, for example in the form of laminates. As a result, the structure is further reinforced.

The tensioning pins 23a arranged close to the surface towards the air gap 21 can form a so-called squirrel cage.

In the event of a short circuit, the risk of demagnetization of the permanent magnets is thus reduced. Owing to the small web width b in the region of the tensioning pin 4a, a magnetic flux barrier is also produced in order to minimize leakage flux.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A rotor for an electrical machine, comprising:
   a first shaft part;
   a second shaft part arranged separately from the first shaft part, said first and second shaft parts being arranged one behind the other with respect to a common axis of rotation;
   a first supporting element connected in a manner fixed against rotation to the first shaft part;
   a second supporting element connected in a manner fixed against rotation to the second shaft part;
   a yoke connecting the first supporting element to the second supporting element and having a plurality of laminates arranged one behind the other, said yoke having an interior provided with cutouts which extend in a direction of the axis of rotation, and permanent magnets arranged in the cutouts, said yoke having holes extending in the direction of the axis of rotation;
   tensioning pins extending through the holes in the yoke to brace the laminates: and
   ribs for connecting the first and second shaft parts, the first and second supporting elements and the yoke to one another,
   wherein the permanent magnets are fixed in the cutouts by an adhesive.

2. The rotor of claim 1, wherein the cutouts on tangential outer sides have a size which is greater than a width of the permanent magnets.

3. The rotor of claim 1, wherein a first plurality of the holes is arranged between the cutouts.

4. The rotor of claim 3, wherein a second plurality of the holes is arranged offset in a radial direction with respect to the first plurality of holes.

5. The rotor of claim 1, wherein at least two permanent magnets are arranged in each of the cutouts, and further comprising an amagnetic separating wall separating the at least two permanent magnets from one another and configured to absorb a centrifugal force of the permanent magnets as the rotor rotates and to divert the centrifugal force into a part of the yoke in confronting relationship to the axis of rotation.

6. The rotor of claim 1, wherein at least two permanent magnets are arranged in each of the cutouts and separated from one another by an air gap.

7. The rotor of claim 1, wherein the yoke has an end side in confronting relationship to the second supporting element, said end side abutting the second supporting element.

8. A wind power generator, comprising a rotor a first shaft part, a second shaft part arranged separately from the first shaft part, said first and second shaft parts being arranged one behind the other with respect to a common axis of rotation, a first supporting element connected in a manner fixed against rotation to the first shaft part, a second supporting element connected in a manner fixed against rotation to the second shaft part, a yoke connecting the first supporting element to the second supporting element and having a plurality of laminates arranged one behind the other, said yoke having an interior provided with cutouts which extend in a direction of the axis of rotation, and permanent magnets arranged in the cutouts, said yoke having holes extending in the direction of the axis of rotation, and tensioning pins extending through the holes in the yoke to brace the laminates, and ribs for connecting the first and second shaft parts, the first and second supporting elements and the yoke to one another, wherein the permanent magnets are fixed in the cutouts by an adhesive.

9. The wind power generator of claim 8, wherein the cutouts on tangential outer sides have a size which is greater than a width of the permanent magnets.

10. The wind power generator of claim 8, wherein a first plurality of the holes is arranged between the cutouts.

11. The rotor of claim 10, wherein a second plurality of the holes is arranged offset in a radial direction with respect to the first plurality of holes.

12. The wind power generator of claim 8, wherein at least two permanent magnets are arranged in each of the cutouts, and further comprising an amagnetic separating wall separating the at least two permanent magnets from one another and configured to absorb a centrifugal force of the permanent magnets as the rotor rotates and to divert the centrifugal force into a part of the yoke in confronting relationship to the axis of rotation.

13. The wind power generator of claim 8, wherein at least two permanent magnets are arranged in each of the cutouts and separated from one another by an air gap.

14. The wind power generator of claim 8, wherein the yoke has an end side in confronting relationship to the second supporting element, said end side abutting the second supporting element.

* * * * *

UNITED STATES PATENT AND TRADEMARK OFFICE
CERTIFICATE OF CORRECTION

PATENT NO. : 8,188,631 B2  Page 1 of 1
APPLICATION NO. : 12/762748
DATED : May 29, 2012
INVENTOR(S) : Christoph Balzer et al.

It is certified that error appears in the above-identified patent and that said Letters Patent is hereby corrected as shown below:

Title Page, item 56

Column 2, line 2, change "2004/0046472 - Erfanfar" to --2004/0046472 - Kiriya--.
Column 2, line 3, change "2007/0096584 - Kiriya" to --2007/0096584 - Erfanfar--.

Signed and Sealed this
Seventeenth Day of July, 2012

David J. Kappos
*Director of the United States Patent and Trademark Office*